United States Patent [19]

Matsumoto et al.

[11] 4,425,023

[45] Jan. 10, 1984

[54] BEAM SPOT SCANNING DEVICE

[75] Inventors: Kazuya Matsumoto, Yokohama; Isao Yamaguchi, Tokyo; Takao Tsuji, Kawasaki; Hideaki Sato, Yokohama, all of Japan

[73] Assignee: Canon Kabushiki Kaisha, Tokyo, Japan

[21] Appl. No.: 228,744

[22] Filed: Jan. 27, 1981

[30] Foreign Application Priority Data

| Jan. 31, 1980 | [JP] | Japan | 55-12939 |
| Feb. 1, 1980 | [JP] | Japan | 55-11337 |
| Feb. 9, 1980 | [JP] | Japan | 55-14989 |

[51] Int. Cl.³ .............................................. G02B 5/172
[52] U.S. Cl. .................. 350/96.14; 350/96.13
[58] Field of Search ............... 350/96.13, 96.14, 96.11, 350/355, 356

[56] References Cited

U.S. PATENT DOCUMENTS

| 3,514,534 | 5/1970 | Korpel | 178/7.5 |
| 3,877,784 | 4/1975 | Lin | 350/96.13 |
| 4,253,060 | 2/1981 | Chen | 350/96.14 |
| 4,297,704 | 10/1981 | Marom et al. | 350/96.13 |

FOREIGN PATENT DOCUMENTS

| 54-6536 | 1/1979 | Japan | 350/355 |
| 54-146619 | 11/1979 | Japan | 350/355 |

OTHER PUBLICATIONS

Hamilton et al., *Optical Engineering*, 16(5), Sep./Oct. 1977, "An Integrated Optical RF Spectrum Analyzer", pp. 475-478.
Anderson, *IEEE Spectrum*, Dec. 1978, pp. 22-29, "Integrated Optical Spectrum . . . ".
Tien et al., *Appl. Physics Letters*, 25(10), Nov. 15, 1974, "Light Beam Scanning and . . . ," pp. 563-565.
Tsai et al., *Proc. of the IEEE*, 64(3), Mar. 1976, "Wide-Band Guided . . . ," pp. 318-328.
Imamura et al., *J. of Appl. Physics*, 48(6), Jun. 1977, "Contact Printing in Amorphous . . . ," pp. 2634-2637.
Lean et al., *Proc. of the IEEE*, 64(5), May 1976, "Thin-Film Acoustooptic Devices," pp. 779-788.
T. Tamir, *Integrated Optics*, published by Spring Verlag, Inc. (1975), pp. 13-29; 83-90; 139-141; 167-189.
Tsai, *Guided-Wave Acousto-Optics Fundamentals and Wideband Applications*, SPIE 139, 132, Guided Wave Optical Systems and Devices (1978).

*Primary Examiner*—John D. Lee
*Assistant Examiner*—Frank González
*Attorney, Agent, or Firm*—Fitzpatrick, Cella, Harper & Scinto

[57] ABSTRACT

A device for scanning a beam spot. The device has a light deflecting portion and a light condensing thin film lens formed on a thin film waveguide path. In this device, a chirped signal is applied to a surface elastic wave transducer constituting the light deflecting portion, whereby scanning of the beam spot is effected on or near the curved end surface of the thin film waveguide path. This device is very compact and capable of high-speed scanning.

11 Claims, 10 Drawing Figures

BEAM SPOT SCANNING DEVICE

BACKGROUND OF THE INVENTION

1. Field of the Invention

This invention relates to a device for scanning a beam spot.

2. Description of the Prior Art

Apparatus for scanning a laser beam spot have heretofore comprised a rotational polygon mirror for deflecting the laser beam and an f-θ lens or the like for condensing the deflected beam into a spot moving at a linear speed. In these prior art apparatus, however, the various operating portions have been separate and independent and a predetermined light path interval has been required therebetween and therefore, precise adjustment during the assembly of the apparatus has been very complicated and the assembled apparatus has been bulky.

There are also known apparatus which use an acoustic optical deflector instead of a rotational polygon mirror to make the apparatus compact. An example of such apparatus is disclosed in U.S. Pat. No. 3,514,534, but even in that example, various operating portions are still independent and therefore, cumbersome adjustment has been required during the assembly and the compactness of the apparatus has been limited.

On the other hand, to reproduce images from a magnetic recording medium on which, for example, TV signals are recorded, it is necessary to move the recording medium and a signal reading head relative to each other at a high speed to thereby effectly scanning in order to obtain a high frequency of 4.2 MHz which is the band of NTSC signal. In the conventional VTR for domestic use, mechanical scanning devices which effect reading by a head rotated at a high speed inside of a recording medium wound on a cylinder have been typical. Generally, however, mechanical scanning devices are inferior to optical scanning devices in accuracy and durability in the case of high-speed scanning and accordingly, there have been desired compact recording or reproducing apparatus utilizing an optical scanning device which can readily realize stable high-speed scanning. Recently, attention has particularly been paid to a system which utilizes the magnetic Kerr effect or the Faraday effect to effect beam spot scanning on a magnetic recording medium and thereby accomplish magnetic recording or reproduction. However, the aforementioned disadvantages of the conventional optical scanning devices have prevented their application to compact and high frequency band recording or reproducing apparatus.

SUMMARY OF THE INVENTION

It is therefore an object of the present invention to provide a beam spot scanning apparatus which is compact and which does not require precise adjustment during the assembly thereof.

It is another object of the present invention to provide a beam spot scanning apparatus which is compact and does not require precise adjustment during the assembly thereof and in which no focus deviation occurs during scanning, that is, the diameter of the spot does not vary during scanning.

The present invention achieves the above objects by utilizing the technique of the light integrated circuit. Recently, there is known a technique of forming a thin film lens, an A/O deflector or an E/O modulator in a thin film waveguide path formed on a base to thereby make a light integrated circuit, as explained in T. Tamir, *Integrated Optics*, published by Spinger Verlag, Inc. (1975). Further, a deflector utilizing the acousto-optic action in a thin film waveguide path to diffract a parallel light beam is disclosed in Proc. IEEE 64, 779 (1976) E. G. Lean et al, *Thin Film Acoustooptic Devices*. Also, an example of the transducer for generating an acoustic wave in a waveguide path over a wide band is disclosed in SPIE 139, (1978) C. S. Tsai, *Guided Wave Optical Systems and Devices*.

A typical device according to this invention for scanning a beam spot comprises a light deflecting portion (transducer) and a light condensing lens portion integrally formed on one and the same base, and is compact and light in weight and accordingly low in cost.

A further object of the present invention is to provide a beam spot scanning type recording and/or reproducing apparatus which is capable of optical high-speed scanning and compact and novel.

Another typical device according to this invention is characterized in that a magnetic transfer film is provided on the light beam exit surface of a thin film waveguide path and a light deflecting portion for deflecting the light beam directed into the waveguide path is provided on a portion of the waveguide path. Also, the device has a condenser lens portion for condensing the light beam and forming a beam spot provided on or near the magnetic transfer film which is provided on the exit surface and the magnetic transfer film to which is transferred the information recorded on a magnetic recording medium positioned in intimate contact with or in proximity to said transfer film, is beam-spot-scanned and the light therefrom is detected to read the recorded information.

The term "light" used herein includes electro-magnetic radiation in both the visible and invisible portions of the spectrum. The term "recording medium" includes magnetically and optically recorded mediums, mediums on which information is permanently recorded, and mediums capable of being rerecorded.

The invention will become more fully apparent from the following detailed description thereof taken in conjunction with the accompanying drawings.

DESCRIPTION OF THE PREFERRED EMBODIMENTS

Figure 1:
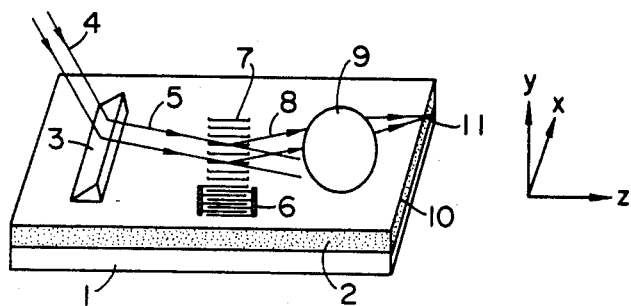
FIG. 1 is a perspective view of a beam spot scanning device of the type which uses a prism coupler to direct a light beam into a waveguide path.

FIG. 1 shows the beam spot scanning device according to a first embodiment of the present invention. In this beam spot scanning device, a prism coupler 3, a comb-tooth-like (interdigital) electrode 6 and a thin film lens 9 are provided on a waveguide path 2 formed on a base 1. A parallel laser beam 4 is directed as a light beam 5 into the waveguide path 2 through the prism coupler 3. The light beam 5 propagated through the waveguide path is diffracted and deflected by an ultrasonic wave surface elastic wave 7 which is excited by the comb-tooth-like electrode 6 provided on a portion of the waveguide path 2. This deflected light beam 8 is condensed by the thin film lens 9 so as to form a beam spot 11 on the end surface 10 of the thin film waveguide path. That is, the end surface 10 is formed at a location substantially coincident with the focal plane of the thin film lens 9 having a power in x-z plane (shown), and the condensed light beam is condensed on or near the end surface 10 with respect to x-direction and exits from the end surface. In y-direction perpendicular to the x-z plane, the width of the spot is limited by the thickness d (usually several μm) of the waveguide path. In the beam spot scanning device of the present embodiment having such a construction, the frequency of a high frequency voltage applied to the comb-tooth-like electrode 6 is varied to vary the wavelength of the ultrasonic wave surface elastic wave on the waveguide path to thereby control the angle of deflection and effect beam spot scanning on the exit end surface.

As described above, the beam spot scanning device of the present embodiment comprises a light deflector and a condenser lens provided on the same base so that a beam spot is formed and scanned on or near the exit end surface of the waveguide path thereof, and this leads to the advantages that the device is compact and that precise adjustment is unnecessary.

The portions which constitute the beam spot scanning device of the above-described embodiment will now be described in greater detail.

A material having a piezoelectric function and through which ultrasonic wave of high frequency may be efficiently propagated is suitable for the base 1, and $LiNbO_3$, $LiTaO_3$, ZnO or the like is desirable. In a case where the base is formed of $LiNbO_3$, the waveguide path 2 may be formed to a thickness of several μm on the base by in-diffusing Ti under a high temperature (about 1000° C.). In a case where the base is formed of $LiTaO_3$, the waveguide path may be provided by in-diffusing Nb or Ti. Other examples are described in the aforementioned book, but the waveguide path of the present embodiment should desirably be formed of a material having a high refractive index and having such a great difference in refractive index from the base that light is propagated even if the waveguide path is made thin. The refractive index of the waveguide path formed of such a material is high and therefore, the beam spot formed on the end surface through the condenser lens can be made very small in spot diameter, namely, sharp.

Figure 2:
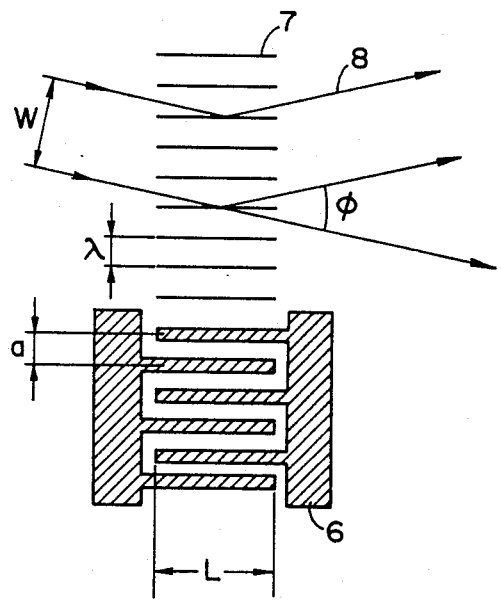
FIG. 2 is a plane view of a light deflecting portion.

The deflector should desirably be one which utilizes an ultrasonic wave surface elastic wave and in the present embodiment, as shown in FIG. 2, an ultrasonic wave is excited by the comb-tooth-like (interdigital) electrode 6 formed on the surface of the waveguide path having a piezoelectric property. The pitch a of the comb-tooth-like electrode is set to ¼ of the center wavelength of the excited ultrasonic wave. For example, if the electrode pitch is set to a=8.8 μm in the case of $LiNbO_3$ base, when a high frequency voltage of 200 MHz is applied thereto, an ultrasonic wave of wavelength 17.5 μm can be excited. (The velocity of the ultrasonic wave is about $3.5 \times 10^6$ mm/sec.) The band of the deflector provided by this single electrode is limited by the angle selection width of a Bragg type diffraction grating created by the excited ultrasonic wave and the band of a transducer comprising this piezoelectric material and an electrode. The band limited by the former Bragg type diffraction is given by the following equation from the aforementioned Proc IEEE 64, 779 (1976), E. G. Lean et al, Thin Film Acoustooptic Devices:

$$\Delta v_1 = 2n \frac{v}{\lambda_o} \frac{\Lambda}{L} \quad (1)$$

where n: refractive index of the waveguide path
$\lambda_o$: wavelength of the incident light beam
v: velocity of the ultrasonic wave surface elastic wave
$\Lambda$: wavelength of the elastic wave
L: width of the elastic wave.

Also, the deflection angle $\Delta\phi$ when the applied frequency has been biased by $\Delta v$ is given by the following formula:

$$\Delta\phi \simeq \frac{\lambda_o}{nv} \Delta v \quad (2)$$

Accordingly, in the device of FIG. 1, the frequency of the signal applied to the electrode 6 is continuously repetitively varied within a predetermined range, whereby the beam spot 11 is continuously scanned in a predetermined range. The number N of scanning points which are separable from one another within this deflection angle is given by the following equation:

$$N = \Delta v \cdot \frac{W}{v} \quad (3)$$

where W is the width of the incident light beam. For example, when $\Delta v = 50$ MHz and W=10 mm and $V = 3.5 \times 10^6$ mm/sec, N=143.

Figure 3:
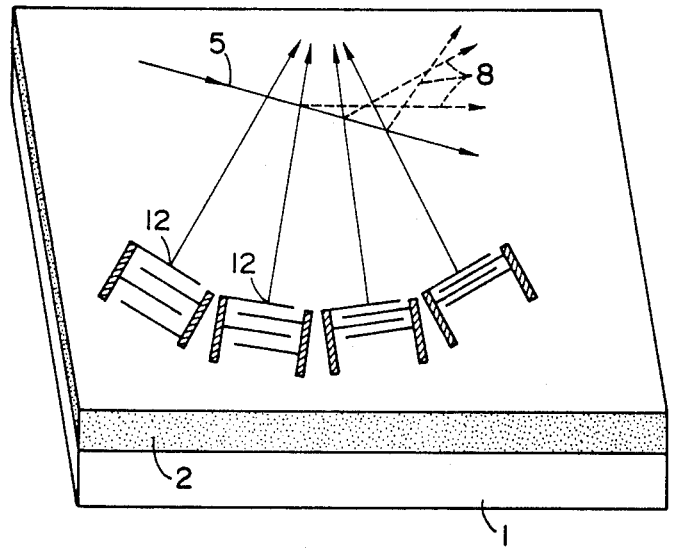
FIG. 3 is a perspective view of a deflecting portion for deflecting light over a wide band.

When it is desired to further increase the number of scanning points, it is possible to utilize the aforementioned wide band deflector shown by C. S. Tsai et al (SPIE vol. 139, p. 139, 1978). This, as shown in FIG. 3, comprises arranging a plurality of electrodes different in pitch at angles which satisfy the Bragg diffraction condition for the incident light in accordance with each wavelength band, causing each transducer 12 to bear a portion of the wide band, and applying to the electrodes so-called chirped signals whose frequency is continuously varied to thereby vary the wide band of 500 MHz. By this, it is possible to obtain 1250 scanning points.

Next, suitable as the thin film lens 9 is a mode index lens, Luneburg lens, Geodesic lens or the like shown in IEEE Quantum Elect vol. QE-13, p. 129, 1977 (by D. W. Vakey & Van E. Wood).

A performance approximate to the theoretical resolution limit is obtained by the latter two types of lenses.

The size (diameter) $\delta_x$ 1 *of the beam spot in x-direction condensed by the thin film lens is given by the following equation in a case where the incident light beam is a parallel light beam of rectangular intensity distribution:*

$$\delta_x = 2.44 \lambda_o \cdot f/nW \quad (4)$$

$$= 2.44 \left(\frac{\lambda_o}{n}\right) F \quad (5)$$

where F is the F-number given by (f/W).

When, in the present embodiment, F-number is set to 2.0 and the wavelength of the incident light is set to $\lambda_o = 820$ nm and the refractive index of the waveguide path is set to n = 2.2, the diameter $\delta_x$ of the beam spot in x-direction is 1.8 μm and, by forming the film thickness of the waveguide path to 1.5 μm, a substantially circular beam spot can be obtained on the exit end surface 10. In FIG. 1, the exit surface need not be the end surface 10 parallel to x-y plane, but by making the end surface 10 oblique, the light may be bent in y-direction and the band area of the end of the waveguide path surface parallel to x-y plane may be the exit surface.

As described above, in the beam spot scanning device of the present invention, the deflector and the condenser lens are formed on the same base and therefore, the device is compact and stable without any arrangement deviation.

Now, the image plane of the thin lens in the ordinary optical system is substantially flat and accordingly, the beam spot scans substantially in a flat plane. However, when use is made of a special lens such as a thin film lens, the image plane (the locus of the point whereat light is condensed) is greatly curved, and therefore, the influence thereof can be neglected in a case where a narrow band is scanned, whereas it becomes a problem in a case where a very wide band is scanned.

Figure 4:
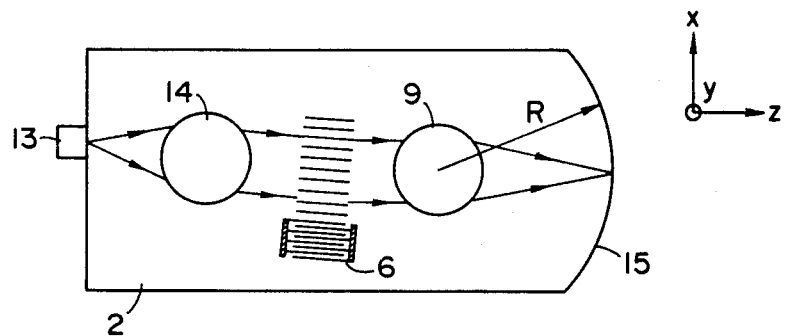
FIG. 4 is a perspective view of a beam spot scanning device in which the exit end surface of the waveguide path is curved so that the diameter of a beam spot does not vary during scanning.

In the case of the aforementioned three types of lenses, the position of the light-condensed point when a light beam has been deflected by $\Delta\phi$ is deviated by $$\Delta = \frac{1}{\cos(\Delta\phi/2)} - 1$$

from the focal plane of the on-axis light beam and the beam spot scanning surface becomes curved. If $\Delta\phi$ is small, say, $\Delta\phi = 6°$ or so, $\Delta = 1$ μm and this can be neglected. When beam spot scanning is effected on the flat end surface as shown in FIG. 1 in a case where the deflection angle is great, that is, the scanned band is wide, the size of the beam spot on the flat end surface will fluctuate due to focus deviation in the course of the scanning, and this is very inconvenient. FIG. 4 shows an embodiment which overcomes such inconvenience.

Figure 5:
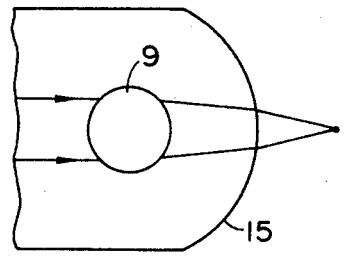
FIG. 5 is a fragmentary view of a device which effects beam spot scanning outside of the end surface of the waveguide path.

The image plane of the circular thin film lens 9 as shown in FIG. 4 lies in x-z plane and on a concentric circle of the thin film lens 9. Accordingly, to solve this focus deviation error, the light beam exit end surface may be made into a cylindrical end surface 15 centered at the center of the lens 9 as shown in FIG. 4. By thus forming the exit surface into a shape substantially conforming to the image plane of the condensing thin film lens, any focus blur can be eliminated. While, in the first embodiment, the light beam is directed to the waveguide path through the coupling prism 3, a semiconductor laser 13 may be installed in proximity to the end surface of the waveguide path as in the embodiment of FIG. 4 so that the light beam may be directly directed to the waveguide path. In this case, however, the light beam becomes a divergent light in the waveguide path 2 and thus, a thin film lens for collimating the light beam will become necessary. The present embodiment is effective not only for a case where the point whereat the light is condensed by the condenser lens 9 lies on the exit end surface 15, but also for a case where the point whereat the light is condensed lies outside of the exit end surface 15 as shown in FIG. 5. In that case, the light is condensed in x-direction, but the light is defocused (out of focus) and diverges in y-direction which is perpendicular to the thin film. Accordingly, to cause the light to be condensed both in x- and y-direction, a cylindrical lens having a condensing function only in y-direction may be provided outside so that the light condensing in y-direction may be coincident with the light-condensed point in x-direction.

Figure 6:
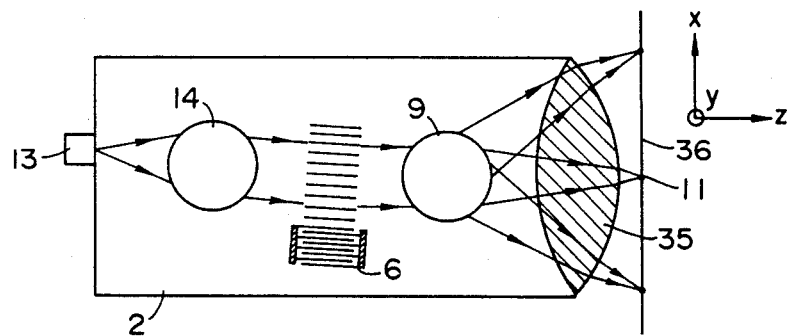
FIG. 6 is a plane view of a beam spot scanning device provided with a field-flat thin film lens.

FIG. 6 shows another embodiment of the beam spot scanning device which solves the problem of focus deviation. The beam spot scanning device shown in FIG. 6, as compared with the device shown in FIG. 1, has a field-flat type thin film lens 35 (field flattener) provided adjacent to the exit end surface of the thin film waveguide path 2, which thin film lens 35 acts on the light beam deflected by a deflecting portion and condensed on the curved image plane near the exit end surface by the thin film lens 9 so as to form a beam spot on a straight line 36. Accordingly, this beam spot scanning device can effect field-flat scanning with respect to the surface of a recorded medium and is preferable as a scanning device. It is also possible to endow this field-flat type thin film lens with an f-θ lens function.

Also, if the field-flat type thin film lens 35 is provided between the exit end surface and the thin film lens 9, the exit end of the waveguide path is made straight as shown in FIG. 1 and the light-condensed point is designed to be coincident with the exit end, then stable plane scanning will be possible on the exit end surface.

In the present embodiment, the thin film lens 9 and the field-flat type thin film lens are installed separately from each other, but if the design conditions permit, they may of course be replaced by a single thin film lens which will function as both lenses.

Description will now be made of some embodiments to which the beam spot scanning device of the present invention is applied.

Figure 7:
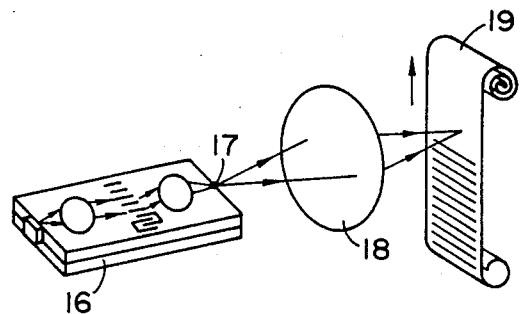
FIG. 7 is a perspective view of a device for recording TV signals on a film by beam spot scanning.

FIG. 7 shows an embodiment in which the beam spot scanning device of the present invention is applied for the film recording of TV images. A beam spot 17 emitted from the beam spot scanning device 16 of the present invention is directed to the surface of a film 19 by a magnifying projection lens 18. The beam spot scanning device 16 comprises the light IC portions shown in FIG. 1. In this case, the base 1 is an LiNbO$_3$ base and the waveguide path is provided by in-diffusing Ti. Now, if N = 500 and $\lambda_o = 0.82\mu$ and f = 15 mm and n = 2.2 and F = (f/W) = 2 and $V_A = 3.5 \times 10^6$ mm/sec, then the band width $\Delta\nu$, swing angle $\delta\phi$, beam spot diameter $\delta_x$, scanning width l and response r will be as follows:

$$\delta_x = 2.44 \frac{\lambda_o}{n} F = 1.8\mu$$

-continued
$$l = 1.8 \times 10^{-3} \times 500 = 0.9 \text{ mm}$$
$$W = 7.5 \text{ mm}$$

$$\Delta\phi = 2 \tan^{-1} \frac{0.9/2}{15} = 3.8°$$

$$\Delta\nu = \frac{nV_A}{\lambda_o} \Delta\phi = 625 \text{ MHz}$$

$$r = \frac{W}{V_A} = 2.1\mu \text{ sec}$$

The film recording of TV images can be accomplished by causing this scanning beam spot to be projected upon a film moved in a direction perpendicular to the beam spot scanning direction by the magnifying projection lens 18. In this case, however, the repetition frequency of the scanning line must be 15.7 KHz and high-speed scanning must be effected for each scanning line of the TV screen.

The features of the thin film waveguide type scanning device of the present invention lie in that it is suited for such high-speed scanning and the output of the driver which drives it may have low power.

Figure 8:
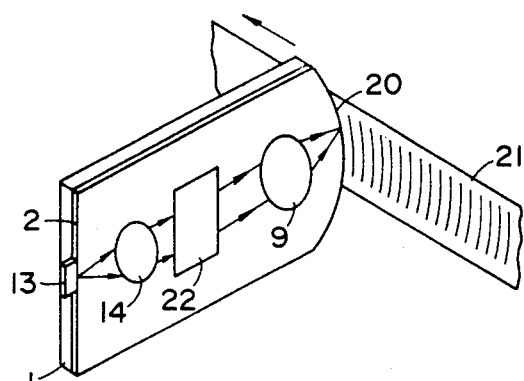
FIG. 8 is a perspective view of a device for effecting scanning and recording on a metal thin film recorded medium.

FIG. 8 shows a second embodiment of the present invention. This embodiment is applied to a recording head in which a metal thin film recording medium 21 such as Ti or Te is installed along and in contact or in a closely spaced relationship with the exit end surface 20 of the beam spot scanning device shown in the second embodiment of the present invention. High-speed scanning is effected by this beam spot scanning device while, at the same time, the recorded medium is moved relative to the scanning device (sub-scanned) in a direction orthogonal to the high-speed scanning direction to thereby record TV image signals. The image signals are provided by current modulating a semiconductor laser 13. The recorded medium may be an amorphous semiconductor such as TeAsGe or GeAs, or an amorphous magnetic thin film such as MnBi, GdCo, GdFe or TbFe. However, in the case of the latter magnetic thin film recorded medium, it will be necessary to apply an external magnetic field in a direction perpendicular to the film. Also, in the case of the latter, modulation need not be imparted to the semiconductor laser but image signals may be imparted to said external magnetic field.

In this second embodiment, reproduction of TV signals can be accomplished by using the same head as that used during the recording, and utilizing the self-coupling action of the semiconductor laser to detect any current variation of the semiconductor laser which is caused due to the fact that the light beam reflected from the recorded medium 21 again comes into the waveguide path 2 and enters the semiconductor laser 13. However, during the reproduction, the output of the semiconductor laser must be lowered so as not to damage the recording signals which have already been recorded.

Where the recorded medium is said photomagnetic recorded medium, the reflected light from the recorded medium is elliptically deflected by the Kerr effect of vertical magnetization and it is converted into an intensity variation in the waveguide path by the mode selecting property of the waveguide path. The signal is detected by the semiconductor laser 13.

If, in the embodiment of FIG. 8, TV signals are recorded with the scanning width being ½ of the width of the thin film recorded medium 21, recording of signals two times as many may be accomplished during one reciprocation and further, if one raster of TV signals is recorded by one scanning line, it will become possible to record signals similar to TV images.

Figure 9:
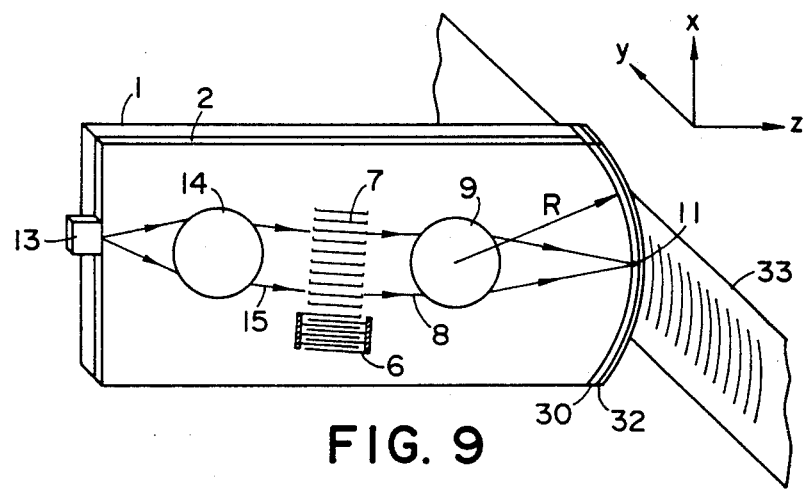
FIG. 9 is a perspective view of a device of an embodiment which reads signals recorded on a magnetic recording medium.

Description will be made of an embodiment of the device for reading the information recorded on a magnetic recording medium by beam spot scanning. FIG. 9 shows such device. In this device, thin film lenses 14 and 9 and a comb-tooth-like electrode 6 are provided on a thin film waveguide path 2 formed on a piezoelectric base 1. The light beam from a semiconductor laser 13 disposed with a spacing an integer times as great as the ½ wavelength of the laser light interposed with respect to the entrance end surface of the base 1, is directed into the thin film waveguide path 2 and is made into a parallel light beam 5 by a thin film lens 14. The parallel light beam 5 propagated through the waveguide path is diffracted and deflected by an ultrasonic wave surface elastic wave 7 which is excited by the comb-tooth-like electrode 6 provided on a portion of the waveguide path 2. Further, this deflected light beam 8 is condensed by the thin film lens 9 so as to form a beam spot 11 on or near the exit end surface of the thin film waveguide path. In y-direction perpendicular to the surface of the waveguide path, the light beam is limited by the thickness d (usually several μm) of the waveguide path. By continuously varying the frequency of the high frequency voltage applied to the comb-tooth-like electrode 6, this light-condensed point moves on an arc centered at the thin film lens 9 with the focal length f as the radius.

In the device of the present embodiment, the exit end surface of the thin film waveguide path is set to an arcuate shape substantially coincident with the locus (image plane) of the aforementioned light-condensed point, and a magnetic transfer film 30 and a protective film 32 are formed on that end surface. Accordingly, said beam spot is scanned on or along the neighborhood of the magnetic transfer film.

The magnetic transfer film 30 is formed of thin films of about 1 μm of a vertically magnetizable amorphous magnetic material such as DyFe, TbFe or GdCo having the magnetic Kerr effect. These thin films are formed by sputtering. (See J. Appl. Phys. 48, p. 2634, by N. Imamura et al.)

This magnetic transfer film 30 is further formed with a protective film 32 (such as $Ta_2O_5$, $SiO_2$, $ZnO_2$, $TiO_2$ or $Cr_2O_3$).

Description will now be made of the function as a reading head for reading signals from the magnetic recording medium of this device. In FIG. 9, a magnetic tape 33, such as $CrO_2$ on which magnetic signals are recorded is brought into close contact with or into proximity to the reading head and is moved relative to the head in the sub-scanning direction substantially perpendicular to the beam spot scanning direction. By each move, a magnetic signal of a portion opposed to a magnetic transfer film 30 is transferred from the magnetic tape 33 to the magnetic transfer film 30. This transferred magnetic signal is spot-illuminated by a beam spot scanning light beam 11. The reflected light from the magnetic transfer film on which the beam spot has impinged is converted from a rectilinearly polarized light into an elliptically polarized light by the Kerr effect of the magnetic signal. Accordingly, this reflected light is converted into an intensity variation by the polarizing characteristic (mode selecting property) of the waveguide path and the ultrasonic wave deflector and reaches the exit end of the semiconductor laser 13. When this reflected light enters the semiconductor laser, the semiconductor laser has the current value thereof varied by a self-coupling phenomenon. Accordingly, the magnetic signals on the magnetic transfer film 30 can be read from said variation in current value.

Figure 10:
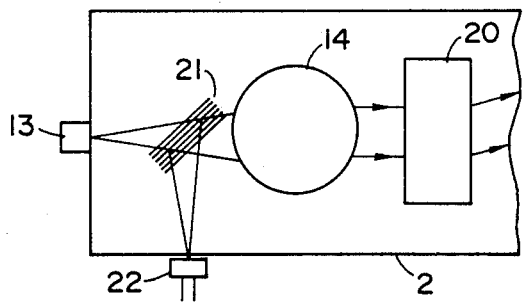
FIG. 10 is a fragmentary view of a modification of a reflected light detecting portion in the device of FIG. 9.

Also, as shown in FIG. 10, a Bragg type diffraction grating 21 may be provided between the semiconductor laser 13 and the thin film lens 14 so that the reflected light may be diffracted at an angle approximate to 90° and directed to a photodetector 22 which may read any variation in quantity of light. This utilizes the fact that the dependency of the diffraction efficiency on the direction of polarization becomes greatest in the diffraction direction approximate to 90°.

While the above-described embodiment uses a transfer film utilizing the Kerr effect, the magnetic transfer film in the present invention may also be a magnetic Garnet film having the Faraday effect. In this case, however, the magnetic film is used as the transmission type and therefore, a reflection film of Al or the like is provided on that surface of the Garnet film which is opposite to the end surface of the waveguide path and further, said protective film of $SiO_2$ or the like is formed on the reflection film. In this embodiment, the light beam having left the exit surface of the waveguide path passes through the Garnet film and in that case, the polarizing surface rotates by the Faraday rotation angle corresponding to the magnetic signal transferred from the magnetic recording medium and further, the rotation of the polarizing surface is increased twofold until the light beam is reflected by said reflection film and returns to the end surface of the waveguide path. Accordingly, the magnetic signals can be read out by converting the rotation of the polarizing surface into an intensity variation as previously described. In FIG. 1, the signals on the magnetic tape are read at high speed in succession by virtue of the relative movement of the magnetic recording tape in the sub-scanning direction and the high-speed beam spot scanning.

As is evidenced by $\delta = 1.8$ μm, $\Delta\nu = 625$ MHz and $\tau = 0.1$ μm, this device can accomplish beam spot scanning of high speed and high resolution and as a result, for example, TV signals recorded on a magnetic tape can read image signals of each scanning line at a repetition frequency of 15.7 KHz.

The features of the thin film waveguide path type reproducing head of the present embodiment lie in that it is suited for such high-speed scanning and that the output of the driver for driving it may have low power.

As described above, in the reproducing head of the present embodiment, a light deflector and a condenser lens are formed on the same base and a magnetic transfer film is integrally provided on the exit end surface of the waveguide path, and this leads to the provision of a reproducing head of the optical scanning type which is compact, highly reliable, capable of high-speed scanning and therefore highly useful.

According to the present invention, as has hitherto been described, there can be provided a beam spot scanning device which is compact, highly reliable and capable of high-speed scanning, and such a beam spot scanning device has various forms and is many applications.

What we claim is:

1. A device for reproducing information on a recorded medium comprising:
    a wave guide for propagating a light beam;
    a magnetic transfer film provided on a light exit surface of said wave guide;
    first means for deflecting said light beam in said wave guide;
    second means for concentrating the deflected light beam on or near said magnetic transfer film; and
    third means for detecting the light beam from said magnetic transfer film.

2. A device according to claim 1, wherein said first means comprises a comb-tooth-like transducer for exciting an acoustic wave in said wave guide, and means for applying to said transducer a signal whose frequency varies repeatedly within a predetermined range.

3. A device according to claim 1, wherein said second means comprises a thin film lens formed on said wave guide.

4. A device according to claim 3, wherein the light exit surface of said wave guide is substantially coincident with or parallel to the locus of the point whereat the light beam is condensed by said thin film lens.

5. A device according to claim 1, wherein said third means comprises a Bragg grating formed on said wave guide and a photodetector.

6. A device according to claim 1, wherein said magnetic transfer film has a protective film provided on its surface.

7. A device for scanning a beam spot, comprising:
    a wave guide for propagating a light beam;
    means for deflecting the light beam in said wave guide; and
    a thin film lens provided in said wave guide for forming the beam spot, wherein said wave guide has an exit surface substantially coincident with or along a curved locus defined by the beam spot formed by said thin film lens.

8. A device according to claim 7, wherein the beam spot is scanned repeatedly within a predetermined spatial range.

9. A device according to claim 7, wherein said deflecting means comprising a comb-tooth-like transducer for exiting an acoustic wave in said wave guide and means for applying a chirped signal to said transducer.

10. A device for scanning a beam spot and for recording a signal on a recording medium, comprising:
    a wave guide for propagating a light beam;
    means for deflecting the light beam in said wave guide; and
    a thin film lens provided in said wave guide for forming the beam spot, wherein said wave guide has an exit surface substantially coincident with or along a curved locus defined by the beam spot formed by said thin film lens, and the recording medium is positioned in proximity to said exit surface.

11. A device according to claim 10, wherein said deflecting means comprises a comb-tooth-like transducer for exciting an acoustic wave in said wave guide and means for applying a chirped signal to said transducer.

* * * * *

UNITED STATES PATENT AND TRADEMARK OFFICE
CERTIFICATE OF CORRECTION

PATENT NO. : 4,425,023

DATED : January 10, 1984

INVENTOR(S) : KAZUYA MATSUMOTO, ET AL.

It is certified that error appears in the above-identified patent and that said Letters Patent is hereby corrected as shown below:

Column 5, line 5, after "$\delta_x$" delete "1";
         lines 5 - 8 should not be italicized;
         line 27, "x-y" should read --x-z--.

Column 6, line 7, after "lens" insert --14--.

Column 7, line 36, "currentmodulating" should read --current modulating--.

Signed and Sealed this

Fifth Day of June 1984

[SEAL]

Attest:

GERALD J. MOSSINGHOFF

Attesting Officer      Commissioner of Patents and Trademarks